(12) United States Patent
Watanabe

(10) Patent No.: US 7,215,682 B2
(45) Date of Patent: May 8, 2007

(54) PACKET SWITCHED NETWORK USING DISTRIBUTED PROTOCOL CONVERTERS FOR INTERFACING USER TERMINALS

(75) Inventor: Noritaka Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1064 days.

(21) Appl. No.: 10/219,278

(22) Filed: Aug. 16, 2002

(65) Prior Publication Data
US 2003/0035439 A1    Feb. 20, 2003

(30) Foreign Application Priority Data
Aug. 16, 2001    (JP)    ............... 2001-247418

(51) Int. Cl.
*H04J 3/22*    (2006.01)
(52) U.S. Cl. .................................... 370/466
(58) Field of Classification Search ............... 370/389, 370/400, 401, 466, 467, 469
See application file for complete search history.

(56) References Cited

U.S. PATENT DOCUMENTS 6,226,676 B1*    5/2001    Crump et al. ............ 709/227
6,405,254 B1*    6/2002    Hadland ................... 709/230
6,597,704 B1*    7/2003    Wong ....................... 370/466

FOREIGN PATENT DOCUMENTS

| JP | 05-145551 | 6/1993 |
|----|-----------|--------|
| JP | 2001-136202 | 5/2001 |

OTHER PUBLICATIONS

J. Forster et al., "Cisco Systems X.25 over TCP (XOT)" RFC 1613, May 1994.*

* cited by examiner

*Primary Examiner*—Chau Nguyen
*Assistant Examiner*—Kerri M Rose
(74) *Attorney, Agent, or Firm*—Young & Thompson

(57) ABSTRACT

A packet switched network is comprised of a communications network, such as the existing IP network, and a number of distributed protocol converters connected to the IP network. X.25 user data terminals are connected to the protocol converters. Each protocol converter serves as an interface between the user data terminals and the IP network by performing protocol conversion between TCP/IP protocol and X.25 protocol.

2 Claims, 4 Drawing Sheets

PACKET SWITCHED NETWORK USING DISTRIBUTED PROTOCOL CONVERTERS FOR INTERFACING USER TERMINALS

BACKGROUND OF THE INVENTION

1. Field of the Invention

The present invention relates generally to packet switched networks, and more specifically to low-cost implementation of a high-capacity packet switched network. The present invention is particularly concerned with a packet switched network using different protocols such as X.25 protocol and IP protocol.

2. Description of the Related Art

As shown in FIG. 1, a data communication network such as the packet switched network specified by ITU-T (International Telecommunication Union-Telecommunication Standardization Sector) Recommendation X.25, is generally organized in groups of X.25 packet switches 120, packet multiplexers 130 and X.25 subscriber packet terminals 100. Packet switches 120 are interconnected by communication links to form a packet network. Host computers 110 are connected to the packet switches 120 to communicate with the subscriber packet terminals 100. Packet multiplexers 130 concentrate the uplink traffic from the packet terminals 100 to the packet network and deconcentrate the downlink traffic from the packet network to the packet terminals. However, because of its independent and dedicated nature, a huge investment cost is required to build a high-capacity X.25 packet switched network. Additionally, the communication links of the X.25 packet network are usually implemented with leased lines or ISDN facilities supplied from network providers. As a result, the subscribers have to bear high communications costs.

SUMMARY OF THE INVENTION

It is therefore an object of the present invention to provide a packet switched network that can be implemented with a low investment cost.

A further object of the present invention is provide a packet switched network where the subscribers bear low communication costs.

The packet switched network of the present invention comprises a communications network operating on a first protocol, a plurality of distributed protocol converters connected to the communications network for performing conversion between the first protocol and a second protocol, and a plurality of data terminals operating on the second protocol, the data terminals being connected to the protocol converters.

Preferably, the communications network is an IP network and the first protocol is TCP/IP protocol and the second protocol is X.25 protocol. Each protocol converter comprises an X.25 protocol processor for performing transmission control on an X.25 packet from the data terminals at different levels of the X.25 protocol, a header encapsulator for formulating an XOT (X.25-over-TCP/IP) header and encapsulating the XOT header in the X.25 packet. A TCP protocol processor is provided for mapping a logical channel number contained in the X.25 packet to a TCP port number in a channel-port mapping table and formulating a TCP/IP packet with a TCP header containing the mapped logical channel number and the TCP port number. An IP protocol processor identifies an IP address of a destination protocol converter from a destination address contained in the X.25 packet, and identifies a MAC address of a destination data terminal, and maps the destination address to the IP address and the MAC address in an address mapping table. Further, the IP protocol processor reformulates the TCP/IP packet with an IP header containing the mapped addresses, and forwards the packet to the IP network.

BRIEF DESCRIPTION OF THE DRAWINGS

The present invention will be described in detail further with reference to the following drawings, in which.

DETAILED DESCRIPTION

Figure 1:
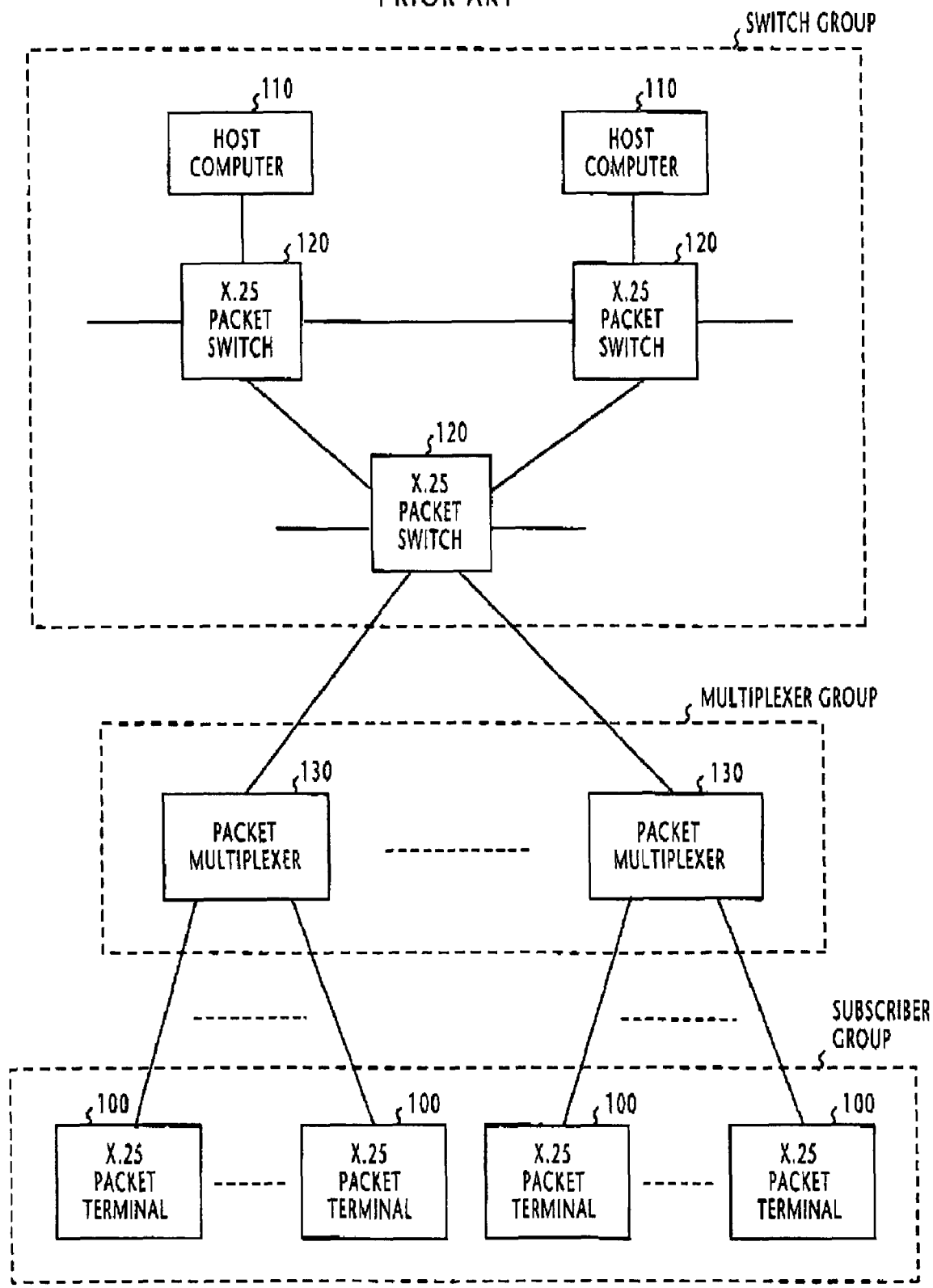
FIG. 1 is a block diagram of a prior art packet switched network.
Figure 2:
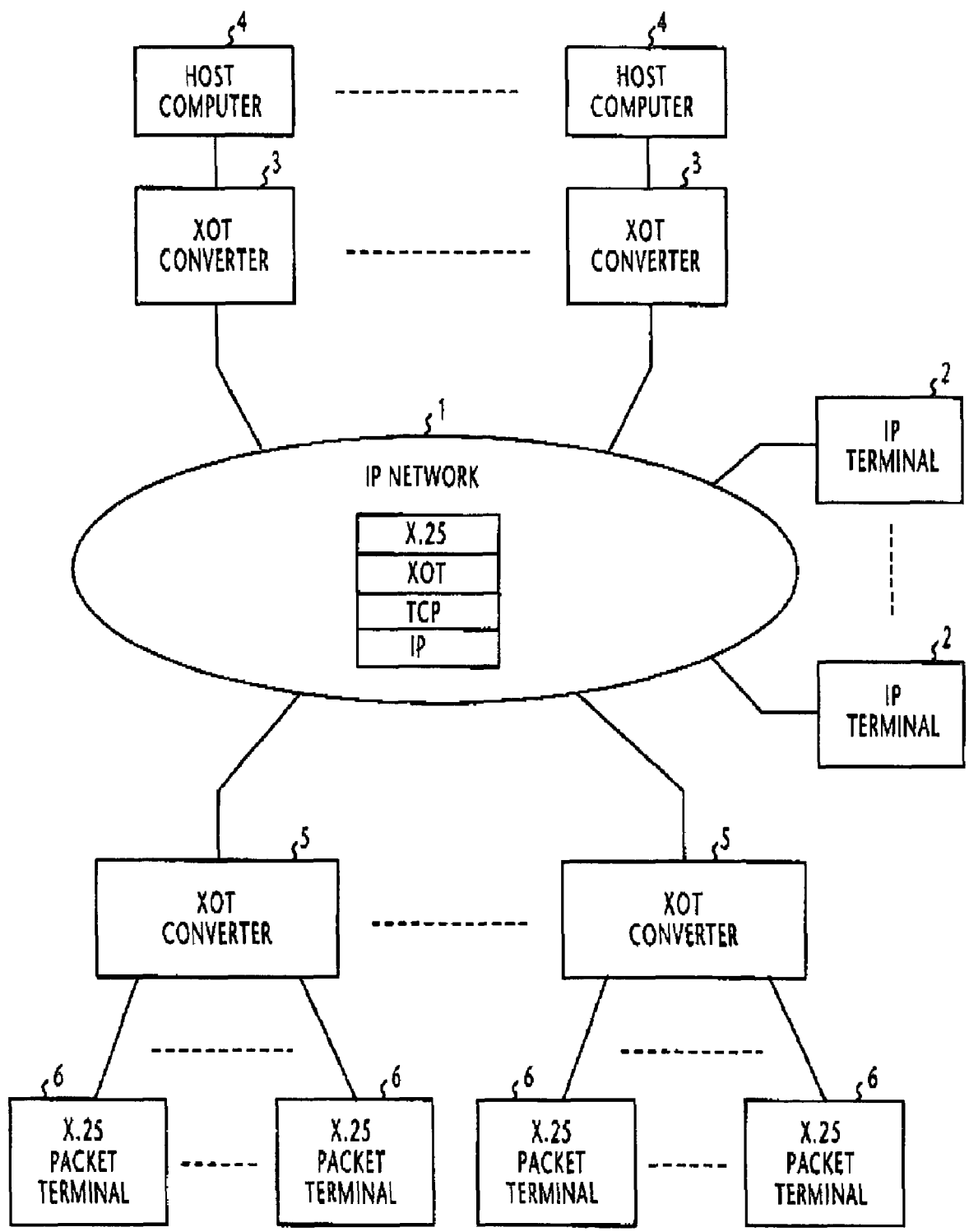
FIG. 2 is a block diagram of a distributed packet switched network of the present invention.

A distributed X.25 packet switched network according to the present invention is shown in FIG. 2. The network of this invention is comprised of a plurality of IP (Internet Protocol) terminals 2, a plurality of XOT (X.25 Over TCP/IP) converters 3 and a plurality of XOT converters 5, all of which are connected to an IP network 1. Host computers 4 are respectively connected to the XOT converters 3, and a plurality of X.25 packet terminals 6 are connected to each of the XOT converters 5.

IP network 1 uses the TCO/IP protocol to perform its routing function among its attached devices including the IP terminals and the XOT converters. Each of the XOT converters is an interface that performs a protocol conversion function between the TCP/IP and the X.25 protocol for establishing logical channels between the IP network and the attached terminals. Host computers 4 and packet terminals 6 operate according to the X.25 protocol in a server-client relationship. IP terminals 2 also establish communication with the X.25 packet terminals 6 and the host computers 4.

The X.25 packet terminals 6 are divided into a plurality of distributed groups of a dozen or so terminals 6 each according to geographic areas, in which the XOT converters 5 are respectively installed to serve the attached packet terminals 6.

The function of the XOT converters 5 is to enable the attached X.25 packet terminals 6 to simultaneously establish a number of logical two-way channels over the IP network 1 to a number of destinations including the host computers, the X.25 packet terminals and the IP terminals.

Figure 3:
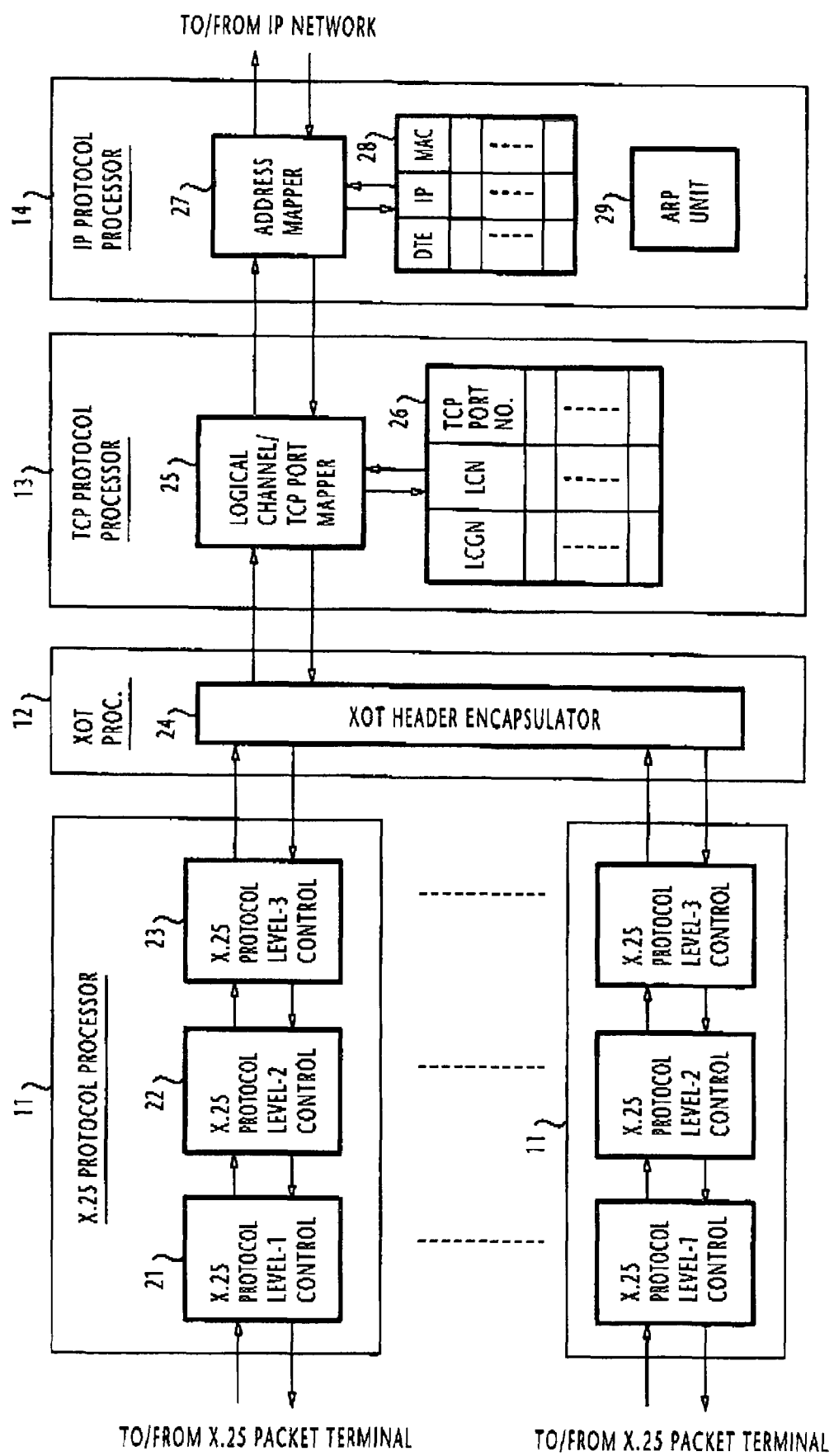
FIG. 3 is a block diagram of an XOT (X.25 over TCP/IP) converter of the present invention which is used to interface a number of X.25 packet terminals to the IP network.

The XOT converters 5 are of identical configuration. As shown in FIG. 3, the XOT converter 5 is comprised of a plurality of X.25 protocol processors 11 of identical construction. These processors are respectively connected in a one-to-one correspondence to the associated X.25 packet terminals 6. Each X.25 protocol processor 11 includes an X.25 protocol level-1 controller 22, an X.25 protocol level-2 controller 21, and an X.25 protocol level-3 controller 23, all of which are connected in series in communication channels of opposite directions of transmission.

The X.25 protocol level-1 controller 21 performs the electrical and physical interfacing functions according to the level-1 protocol of the X.25 Recommendation. The X.25 protocol level-2 controller 22 performs the termination of frames according to the level-2 protocol of the X.25 Recommendation. The X.25 protocol level-3 controller 23 performs the call setup and release functions and the error and flow control functions according to the level-3 protocol of the X.25 Recommendation. All of these functions are performed in opposite directions of transmission over the IP network.

Each X.25 protocol processor 11 is connected to an XOT processor 12. The XOT processor 12 includes an XOT header encapsulator 24, which uses the information supplied in an X.25 control packet from the X.25 protocol processor 11 to formulate an XOT header and encapsulates it in the packet so that the latter is routed to the destination XOT converter.

The packet containing the XOT header is supplied to a TCP protocol processor 13. This processor includes a logical channel/TCP port mapper 25 for mapping a logical channel group number (LCGN) and a logical channel number (LCN) contained in the X.25 packet to a TCP port number in a mapping table 26 according to the destination address contained in the control packet. The X.25 control packet is followed by X.25 message packets. When the TCP protocol processor 13 receives an X.25 message packet from the XOT processor 12, it encapsulates the received X.25 packet in the payload field of a TCP/IP packet and the mapper 25 consults the mapping table 26 to determine its TCP port number which corresponds to the LCGN and LCN information contained in the received packet and inserts the determined TCP port number into the TCP header of the TCP/IP packet. Additionally, the TCP protocol processor 13 performs connection control with the destination XOT converter.

The TCP/IP packet (control or message) from the TCP protocol processor 13 is applied to an IP protocol processor 14, which includes an address mapper 27 and a mapping table 28. If the packet from the TCP protocol processor 13 is a control packet, the address mapper 27 identifies the IP address of the destination XOT converter from the destination DTE address contained in the received packet and determines the MAC (media access control) address of the destination X.25 DTE terminal by using an address resolution (ARP) unit 29. The DTE address of the source packet terminal 6 is mapped to the identified IP address as well as to the MAC address of the destination DTE terminal in the mapping table 28. The determined IP and MAC addresses are inserted into the IP header of the TCP/IP control packet, which is then forwarded to the IP network 1. If the packet received from the TCP protocol processor 13 is a message packet, the mapper 27 uses the DTE address of the source packet terminal to consult the mapping table 28 and identifies its corresponding IP and MAC addresses. The identified IP and MAC addresses are inserted into the IP header of the TCP/IP message packet before the packet is forwarded to the IP network 1.

The TCP/IP packet transmitted to the IP network 1. If the packet is a control packet, the IP network uses its IP header to establish a communication path to one of the XOT converters 3, and if the packet is a message packet, the IP network examines its IP header to identify the established path to transport the packet to the destination XOT converter.

Figure 4:
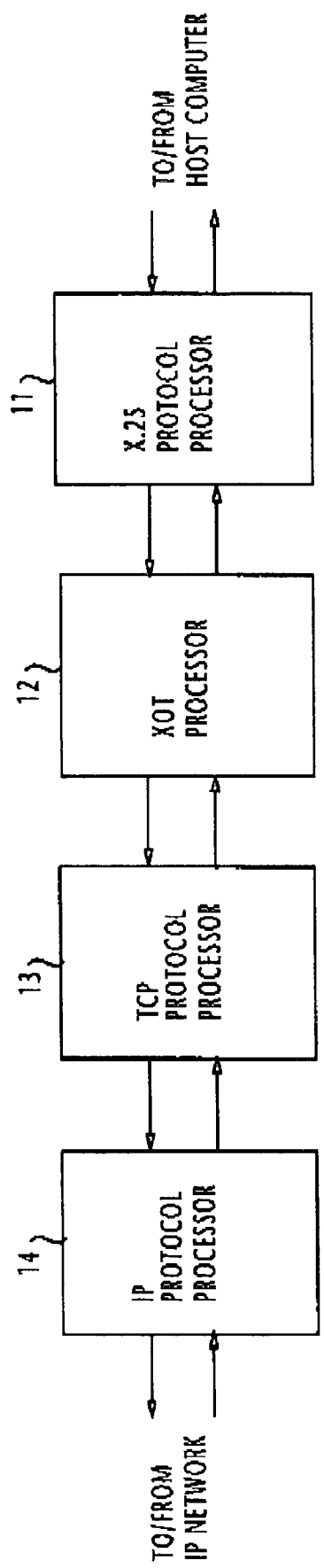
FIG. 4 is a block diagram of an XOT converter of the present invention which is used to interface a host computer to the IP network.

As shown in FIG. 4, the XOT converter 3 is generally similar to the XOT converter 6 except that it includes only one X.25 protocol processor 11 since the host computer 4 attached to it must handle high information traffic.

When a TCP/IP packet is transmitted from the IP network 1 to the destination XOT converter 3, the packet is successively processed through the ID protocol processor 14, the TCP protocol processor 13, the XOT protocol processor 12, and the X.25 protocol processor 11, so that the original X.25 packet is recovered from the received TCP/IP packet and transmitted to the destination host computer 4.

X.25 packets transmitted from the host computer are treated in the same manner through the destination XOT converter 3, where the packets are transformed into TCP/IP packets and routed through the IP network to the source XOT converter 5, where the original X.25 packets are recovered for transmission to the source packet terminal 6.

It is seen that the provision of XOT converters in geographically dispersed areas allow a large number of X.25 packet terminals to use the existing IP network as a backbone transport network. Since the transmission facilities of network providers are not necessary for the implementation of the present invention, a high-capacity X.25 packet switched network can be built with a minimum of investment for serving a large number of X.25 user terminals. Thus, a dedicated X.25 packet switched network is not required.

Various alterations and modifications are apparent to those skilled in the art without departing from the scope of the claims that define the present invention. For example, the XOT converter could also be used for interfacing an existing X.25 packet network to the existing IP network or interfacing an existing X.25 packet terminal to the IP network when the configuration of the network of the terminal is updated.

What is claimed is:

1. A packet switched network comprising:
    a communications network operating on a TCP (Transmission Control Protocol)/IP (Internet Protocol) protocol;
    a plurality of distributed protocol converters connected to said communications network for performing conversion between said TCP protocol and an X.25 protocol; and
    a plurality of data terminals operating on said second X.25 protocol, said data terminals being connected to said protocol converters,
    wherein each of said protocol converters comprises:
    an X.25 protocol processor for performing transmission control on an X.25 packet from said data terminals at different levels of the X.25 protocol;
    a header encapsulator for formulating an XOT (X.25-over-TCP/IP) header and encapsulating the XOT header in said X.25 packet;
    a TCP protocol processor including a channel-port mapping table for mapping therein a logical channel number contained in said X.25 packet to a TCP port number and formulating a TCP/IP packet with a TCP header containing the mapped logical channel number and the TCP port number; and
    an IP protocol processor including an address mapping table for identifying an IP address of a destination protocol converter from a destination address contained in said X.25 packet, identifying a MAC (media access control) address of a destination data terminal, and mapping said destination address to said IP address and said MAC address in said address mapping table, and reformulating the TCP/IP packet with an IP header containing the mapped addresses, and forwarding the packet to said IP network.

2. The packet switched network of claim 1, wherein said X.25 protocol processor is provided in a one-to-one correspondence to each of said data terminals.

* * * * *